United States Patent
Lin

(10) Patent No.: US 9,824,608 B1
(45) Date of Patent: Nov. 21, 2017

(54) SYSTEMS AND METHODS FOR VISUALLY GUIDED HARDWARE INSTALLATION

(71) Applicant: Pure Storage, Inc., Mountain View, CA (US)

(72) Inventor: Howard Lin, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 27 days.

(21) Appl. No.: 14/885,200

(22) Filed: Oct. 16, 2015

(51) Int. Cl.
| | |
|---|---|
| *G09B 19/00* | (2006.01) |
| *G09B 5/02* | (2006.01) |
| *H04L 12/26* | (2006.01) |

(52) U.S. Cl.
CPC .......... *G09B 19/0053* (2013.01); *G09B 5/02* (2013.01); *H04L 43/045* (2013.01); *H04L 43/0811* (2013.01)

(58) Field of Classification Search
CPC ........................... H04L 43/045; H04L 43/0811
See application file for complete search history.

(56) References Cited

U.S. PATENT DOCUMENTS

| | | | | |
|---|---|---|---|---|
| 7,337,227 B1 | 2/2008 | Hsieh et al. | | |
| 2008/0281947 A1* | 11/2008 | Kumar | ................ | H04L 41/0806 709/220 |
| 2012/0297052 A1* | 11/2012 | Qin | ..................... | H04L 41/0677 709/224 |

* cited by examiner

*Primary Examiner* — Albert Wang
(74) *Attorney, Agent, or Firm* — Womble Carlyle Sandridge & Rice LLP

(57) ABSTRACT

A method for visually guided storage array installation is disclosed. The method includes receiving an installation plan for a storage array and determining a component of the storage array that is specified in the installation plan. One or more visual indicators that are associated with the component of the storage array are displayed to indicate a status corresponding to executing a portion of the installation plan.

20 Claims, 3 Drawing Sheets

SYSTEMS AND METHODS FOR VISUALLY GUIDED HARDWARE INSTALLATION

BACKGROUND

In computers and computer networks, installation refers to the specific details, of the act or process of making a computer or computers in the network ready for use. Installing can entail the methodical process of readying such computers for use in a particular place or space.

In conventional practice, technicians can be employed to perform installations using diagrams. However, conventional installation processes can be undesirable as any mistakes in such processes can present significant risks.

Mis-cabled arrays/shelves can cause customer downtime and other issues. Moreover, documentation and diagrams may not be enough for a successful installation/configuration. In particular, engineers may not have the latest/correct documentation and diagrams for the process. For example, equipment and components may be in different orientations/positions than are indicated in the documentation and diagrams. Also, it is difficult to describe connection procedures, documentation and diagrams over the phone.

It is in this context in which the present embodiments arise.

SUMMARY

The inadequacies of conventional installation processes can result in customer downtime and other issues. A method for visually guided storage array installation is disclosed that addresses the aforementioned shortcomings of conventional technologies. However, the claimed embodiments are not limited to implementations that address any or all of the aforementioned shortcomings. The method includes receiving an installation plan for a storage array and determining a component of the storage array that is specified in the installation plan. One or more visual indicators that are associated with the component of the storage array are displayed to indicate a status corresponding to executing a portion of the installation plan.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The invention, together with further advantages thereof, may best be understood by reference to the following description taken in conjunction with the accompanying drawings.

It should be noted that like reference numbers refer to like elements in the figures.

DETAILED DESCRIPTION

Figure 1A:
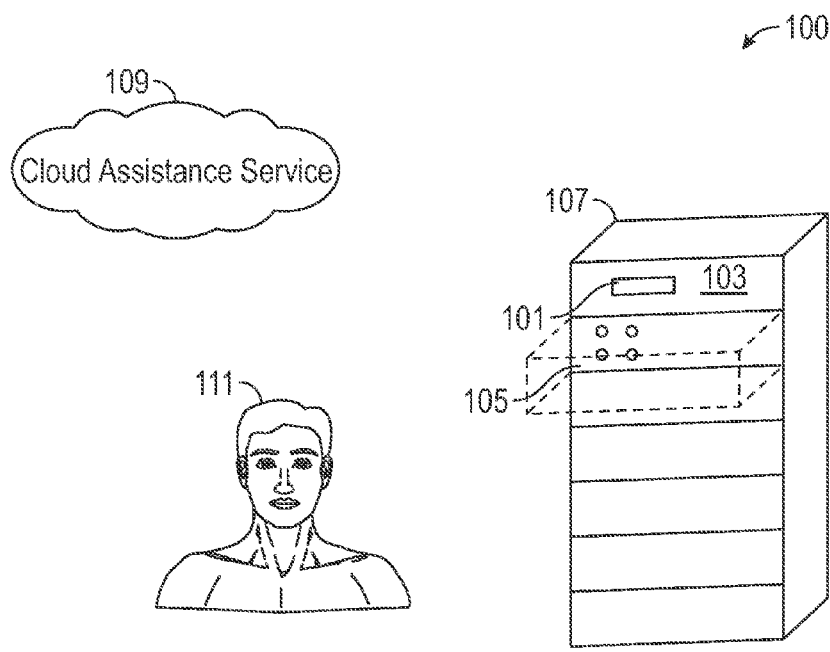
FIG. 1A shows an exemplary operating environment of a system for visually guided storage array installation according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "determining" or "displaying" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1A shows an exemplary operating environment 100 of system 101 for visually guided hardware installation. System 101 visually guides hardware installation and provides visual indications of the status of the visually guided hardware installation. System 101, as a part of providing visual indications of the status of the visually guided hardware installation, controls the display of one or more visual indicators associated with each of the components (ports for cables, spaces for drives, etc.) of a storage array that are involved in an installation of the storage array. The visual indicators are designed to indicate a status corresponding to the execution of portions of an installation plan. In one embodiment, an indication of an action to take can be also be provided based on the status. FIG. 1A shows system 101, storage array controller 103, storage arrays 105, rack frame 107, cloud assistance service 109, technician 111.

Referring to FIG. 1A, rack frame 107 is a frame or enclosure for mounting equipment modules that can include but are not limited to storage array controllers 103 and storage arrays 105. In one embodiment, system 101 can run on the operating system of controller 103. System 101 directs the activation of a series of indicators that visually guide storage array installation based on an installation plan. In one embodiment, system 101 interacts with an indicator control system (not shown) of storage array 105 to cause the activation of the series of indicators according to the installation plan. Moreover, system 101 monitors the installation process and causes indicators that are associated with components of the storage array module that is being installed to provide a visual indication of the status of the installation process. In one embodiment, system 101 can assign or map actions and indications to various components of storage array 105. In one embodiment, actions and indications can be mapped to an initial state. For example, a fresh installation of storage array 105 can include the receipt of an installation plan upon initial startup of the array that maps actions and indications to various components. In one embodiment, status indications can communicate any status that accurately describes the state of an installation at a particular point (good, bad, error etc.). In one embodiment, the status indication can correspond to a particular component of a storage array and a particular portion of the installation plan. In one embodiment, the visual manner in which the indications are made can be any manner that is appropriate to communicate the status (red illumination, exclamation symbol, etc.). For example, in the case of a mis-cabling or other installation error, a visual indication of the mis-cabling can be provided via one or more indicators, such as red and/or flashing indicators, that are associated with the port or ports that are involved in the mis-cabling. In addition, the one or more indicators can provide an indication of an action to take based on the status. In one embodiment, the indication can include a distinct attribute or display that corresponds to one or more continuation or corrective actions (green light indicating proceed or continue, red light indicating remove, add, go-to, go-back, etc.). In one embodiment, status indication is repeated for each portion of the installation plan specifying a component of the storage array (where the status indication for the portion of the installation plan is presented and where a status indicator indicating proceed or continue being indicative of a completed state for the portion in one embodiment). These operations are continued until the installation of the storage array is completed. In one embodiment, system 101 can be a part of an operating system (e.g., Purity™) of controller 103 or can be separate from the operating system but can work cooperatively with the operating system (for example as a part of separate software or firmware with components that operate on controller and/or on devices or components of storage array 105).

In one embodiment, updates to storage arrays 105 can be made, and, such updates can be accommodated by system 101. In one embodiment, system 101 can detect updates that are made to storage arrays 105. In one embodiment, in response to detecting an update to storage arrays 105, system 101 can receive a new or modified installation plan for the updated storage array. In one embodiment, based on a new or modified installation plan mappings may be re-assigned (based on the hardware change to the "updated" state). Storage array controller 103 manages the storage arrays 105 that are mounted in rack frame 107. Storage arrays 105 are data storage modules that are designed such that each of various ones of their components are associated with one or more indicators that are externally visible. In one embodiment, the one or more indicators can be used to visually guide installation of storage arrays 105. Moreover, as discussed above, the one or more indicators can be used to indicate the status of the installation process at each phase of the process.

In one embodiment, installation technicians 111 can initiate a visually guided installation. In other embodiments, a visually guided installation can be initiated by cloud assistance service 109. As a part of the installation operations, installation technicians 111 are visually guided to take one or more actions, in accordance with an installation plan, that together result in the completion of the installation of a storage array, making the storage array ready for use.

Cloud assistance service 109 maintains installation plans and provides the installation plans to data storage controller 103 (where the installation plans are received). In other embodiments, installation plans can be provided from other sources such as websites. In still other embodiments, installation plans can be placed into storage arrays as a part of the packaging of the storage arrays. In one embodiment, cloud assistance service 109 or other sources can provide updated or new plans when an update to hardware is detected. For example, cloud assistance service 109 or other sources can provide updated or new plans when upgrades to components such as storage array controller 103 and storage arrays 105 are made.

Figure 1B:
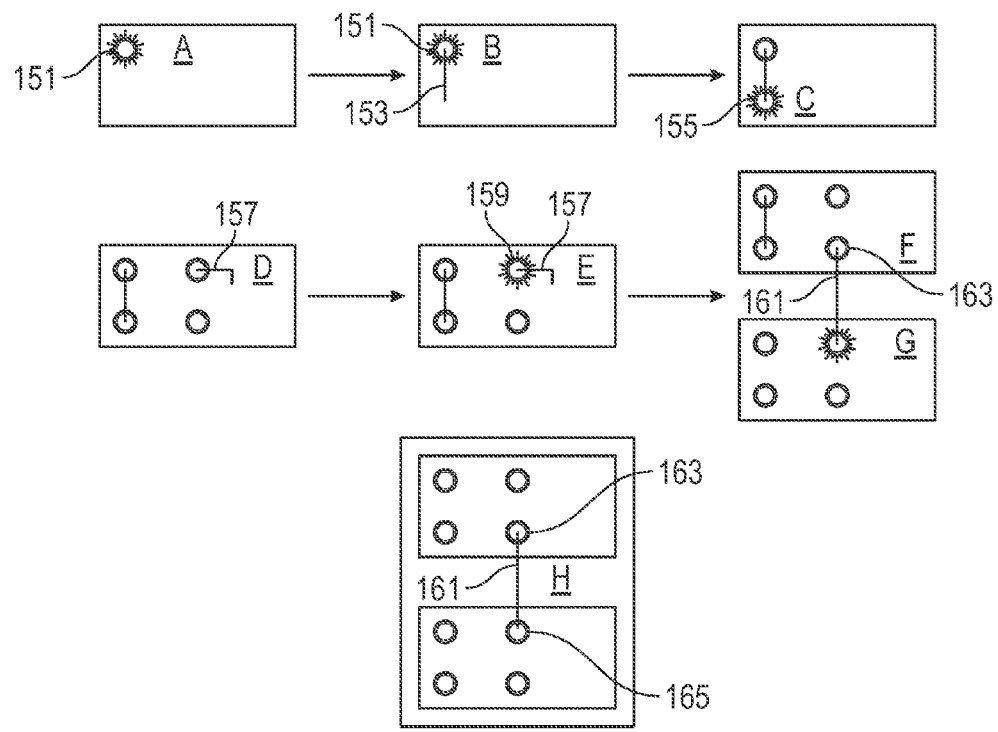
FIG. 1B illustrates the operation of a system for visually guided storage array installation according to one embodiment.

FIG. 1B illustrates the operation of system 101 for visually guided storage array installation according to one embodiment. These operations, which relate to visually guided storage array installation, are only exemplary. Moreover, it should be appreciated that other operations not illustrated in FIG. 1B can be performed in accordance with one embodiment. In the description of FIG. 1B below, references to "a first indicator" "a second indicator" etc., are intended to refer to one or more indicators.

Referring to FIG. 1B, at A, a first indicator is activated to identify a first component 151 of a storage array and an action of a first part of an installation plan to take with respect to the first component of the storage array. At B, the installation technician completes the action. In FIG. 1B this is shown by the connection of cable 153, to component 151.

At C, a second indicator is activated that indicates the successful completion of a first part of the installation plan. And, that identifies a second component of the storage array, and, an action of a second part of the installation plan to take with respect to the second component of the storage array. In FIG. 1B, this is shown by the illumination that is associated with component 155. At D, the installation technician makes an incorrect action. In FIG. 1B this is shown as the connection of cable 157 to component 159.

At E, an indicator is activated that indicates that the action taken by the technician is incorrect and that identifies a corrective action. In FIG. 1B this shown by the illumination that is associated with component 159. In one embodiment, the corrective action can be indicated by an attribute of the illumination. In one embodiment, the attribute can include but is not limited to color, blinking or any other attribute that can communicate a corrective action. At F, the installation technician completes the corrective action. In FIG. 1B this shown by the connection of cable 161 to component 163.

At G, an indicator indicates that the corrective action has been successfully completed. In one embodiment, the indicator can also identify a next component 151 of the storage array and an action of a next part of the installation plan to take with respect to the next component. In FIG. 1B this is shown by the activation of the indicator associated with component 165.

At H, the installation technician completes the action indicated at G (a connection of cable 161 to component 165). And, an indication that the installation has been successfully completed is made (for example a blinking of indicators associated with component 165).

Figure 2:
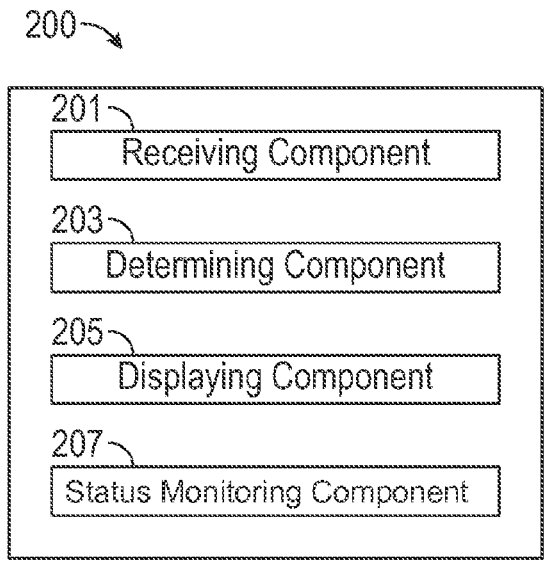
FIG. 2 shows components of a system for visually guided storage array installation according to one embodiment.

FIG. 2 shows components of a system 101 for visually guided storage array installation according to one embodiment. In one embodiment, the components of system 101 implement an algorithm for visually guided storage array installation. In the FIG. 2 embodiment components of system 101 include receiving component 201, determining component 203, displaying component 205 and status monitoring component 207.

Receiving component 201 receives installation plans for storage arrays. In one embodiment, the installation plans can be provided from a cloud assistance service. In other embodiments, the installation plans can be placed into storage components of storage arrays as a part of the assembling of the storage arrays and prior to their readiness for use (e.g., during manufacturing).

Determining component 203 determines the components of the storage array that are specified in the installation plan for an installation plan action that should be taken. In one embodiment, determining component 203 successively identifies components for installation plan actions, and advances from one component to the next upon the successful completion of an installation plan action for an identified component. In one embodiment, in addition to determining components that are specified in the installation plan for an installation plan action, an action that is specified in the installation plan for the determined components of the storage array can be prompted by determining component 203.

Displaying component 205 causes the display of one or more visual indicators that are associated with the component of the storage array that is determined by determining component 203. The one or more indicators indicate a status that is related to the execution of a portion of the installation plan (that corresponds to the determined component of the storage array).

Status monitoring component 207 monitors the status of the installation plan and causes one or more indicators to provide an indication of an action to take based on the status. In one embodiment, the indication can include one of a distinct attribute or display that corresponds to one or more corrective actions.

It should be appreciated that the aforementioned components of system 101 can be implemented in hardware or software or in a combination of both. In one embodiment, components and operations of system 101 can be encompassed by components and operations of one or more computer components (e.g., 105 Purity™ OS). In another embodiment, components and operations of system 101 can be separate from the aforementioned one or more computer components but can operate cooperatively with components and operations thereof.

Figure 3:
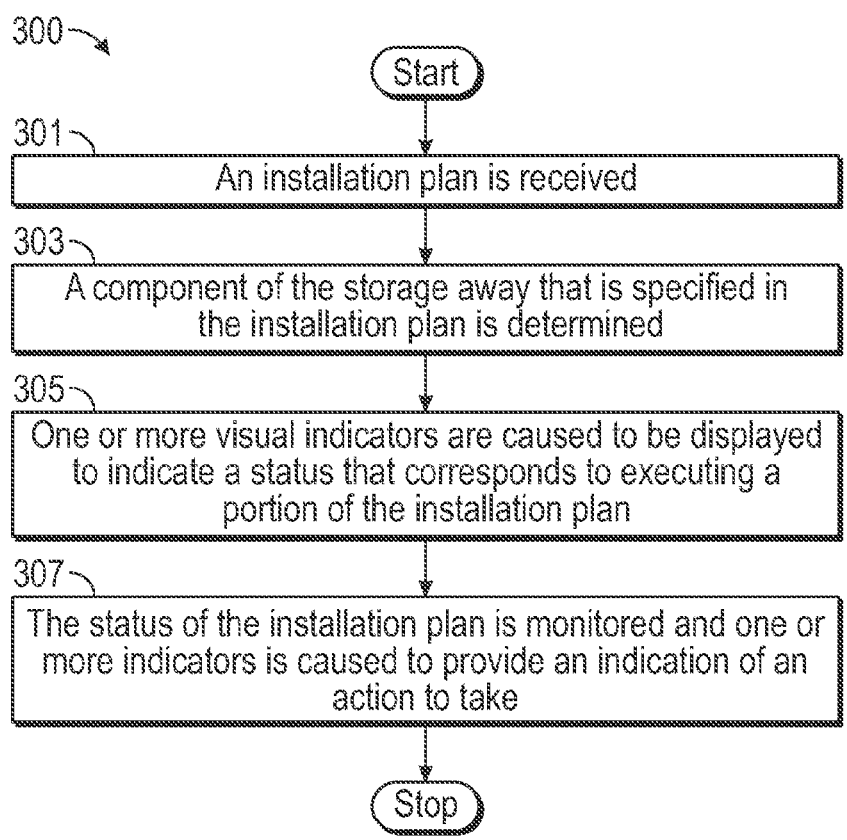
FIG. 3 shows a flowchart of a method for visually guided storage array installation according to one embodiment.

FIG. 3 shows a flowchart 300 of a method for visually guided storage array installation according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301 an installation plan is received for a storage array. In one embodiment, the installation plan can be provided from a cloud assistance service. In other embodiments, the installation plan can be placed into a storage array as a part of the manufacturing of the storage array.

At 303, a component of the storage array that is specified in the installation plan is determined. In one embodiment, an action that is specified in the received installation plan for the determined component can be prompted.

At 305, one or more visual indicators that are associated with the component of the storage array are caused to be displayed to indicate a status that corresponds to the execution of a portion of the installation plan (that corresponds to the determined component of the storage array).

At 307, the status of the installation plan is monitored and one or more indicators is caused to provide an indication of an action to take based on the status. In one embodiment, the indication includes one of a distinct attribute or display that corresponds to one or more corrective actions.

Figure 4:
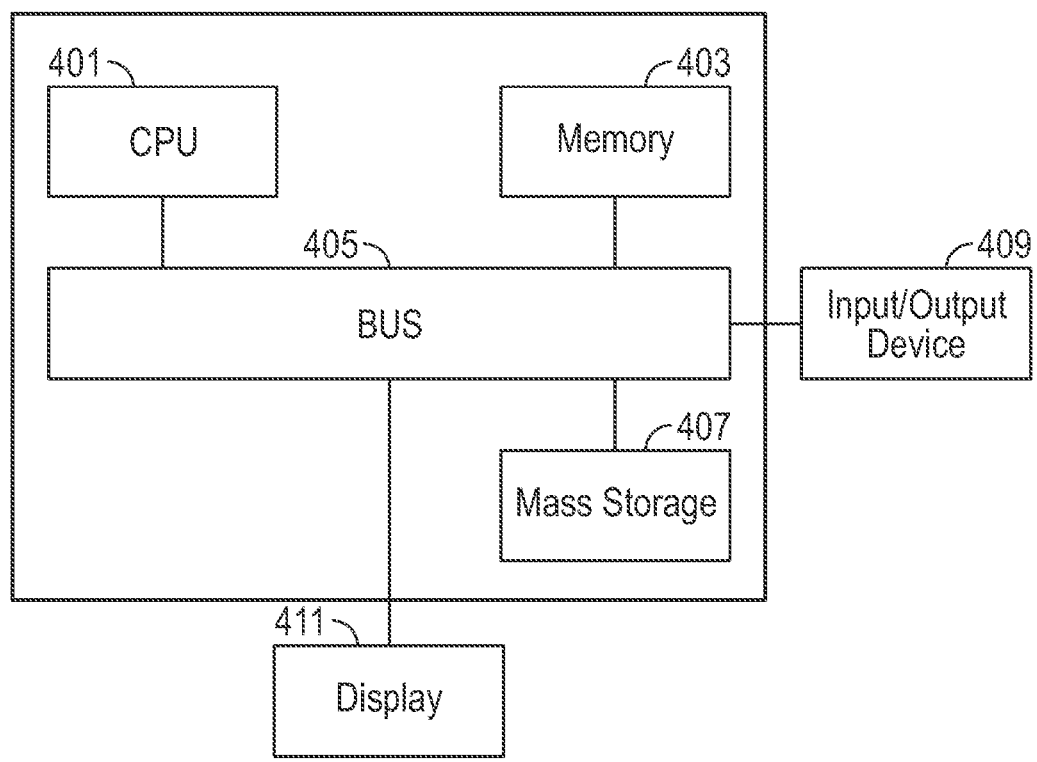
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only functions that support the purpose of the special purpose computer may be used in the alternative. FIG. 4 is an illustration showing an exemplary computing device which may implement the embodiments described herein. The computing device includes a central processing unit (CPU) 401, which is coupled through a bus 405 to a memory 403, and mass storage device 407. Mass storage device 407 represents a persistent data storage device such as a disc drive, which may be local or remote in some embodiments. The mass storage device 407 could implement a backup storage, in some embodiments. Memory 403 may include read only memory, random access memory, etc. Applications (e.g., 101 in FIG. 1A) resident on the computing device may be stored on or accessed via a computer readable medium such as memory 403 or mass storage device 407 in some embodiments. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1A-3. The code embodying this functionality may be stored within memory 403 or mass storage device 407 for execution by a processor such as CPU 401 in some embodiments. The operating system on the computing device may be Purity™, MS-WINDOWS™, UNIX™, LINUX™, iOS™, CentOS™, Android™, Redhat Linux™, z/OS™, or other operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that while the embodiments are described with regard to a storage array, the embodiments may be extended to any device having to be configured for installation or reconfigured and is not limited to a storage array.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

With regard to exemplary embodiments thereof a method for visually guided storage array installation is disclosed. The method includes receiving an installation plan for a storage array and determining a component of the storage array that is specified in the installation plan. One or more visual indicators that are associated with the component of the storage array are displayed to indicate a status corresponding to executing a portion of the installation plan.

In one embodiment, an installation plan can be received by controller 103 (and maintained in storage components and/or registers of controller 103) and used by system 101 in the execution of a visually guided installation. In one embodiment, a modified installation plan can be received in response to detecting an update to the storage array. Moreover, in one embodiment, detecting an update to the storage array includes determining hardware that requires a differing installation plan. In one embodiment, one or more visual indicators are displayed where the displaying includes the activation of a first indicator associated with a component of the storage array and the de-activation of a second indicator associated with a component of the storage array in response to executing a portion of the installation plan. In one embodiment, the displaying one or more visual indicators is repeated until all portions of the installation plan specifying a particular component of the storage array has been completed. At least one embodiment further includes monitoring a status of the installation plan and causing one or more indicators to provide an indication of an action to take based on the status. In one embodiment, the indication includes one of a distinct attribute or display that corresponds to one or more corrective actions.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for visually guided storage array installation, the method comprising:
   receiving an installation plan for a storage array;
   determining a component of the storage array specified in the installation plan; and
   displaying one or more visual indicators associated with the component of the storage array to indicate a status corresponding to executing a portion of the installation plan, wherein displaying one or more visual indicators comprises: activation of a first indicator associated with the component of the storage array; and de-activation of a second indicator associated with a component of the storage array in response to executing the portion of the installation plan.

2. The method of claim 1, further comprising receiving a modified installation plan in response to detecting an update to the storage array.

3. The method of claim 2, wherein detecting an update to the storage array comprises determining hardware that requires a differing installation plan.

4. The method of claim 1, further comprising repeating until all portions of the installation plan specifying the component of the storage array have been completed.

5. The method of claim 1, further comprising:
monitoring a status of the installation plan and causing one or more indicators to provide an indication of an action to take based on the status.

6. The method of claim 5, wherein the indication comprises one of a distinct attribute or display that corresponds to one or more corrective actions.

7. A non-transitory computer readable medium containing instructions for causing
a computer to perform a method, the method comprising:
receiving an installation plan for a storage array;
determining a component of the storage array specified in the installation plan; and
displaying one or more visual indicators associated with the component of the storage array to indicate a status corresponding to executing a portion of the installation plan, wherein displaying one or more visual indicators comprises: activation of a first indicator associated with a component of the storage array; and
de-activation of a second indicator associated with the component of the storage array in response to executing the portion of the installation plan.

8. The method of claim 1, wherein the one or more visual indicators indicate status of an installation process at each phase of the installation process, for a plurality of phases.

9. The medium of claim 7, wherein the method further comprises receiving a modified installation plan in response to detecting an update to the storage array.

10. The medium of claim 9, wherein detecting an update to the storage array comprises determining hardware that requires a differing installation plan.

11. The medium of claim 7, wherein the method further comprises repeating until all portions of the installation plan specifying the component of the storage array have been completed.

12. The medium of claim 7, wherein the method further comprises:
monitoring a status of the installation plan and causing one or more indicators to provide an indication of an action to take based on the status.

13. The medium of claim 12, wherein the indication comprises one of a distinct attribute or display that corresponds to one or more corrective actions.

14. The medium of claim 7, wherein the one or more visual indicators indicate status of an installation process at each phase of the installation process, for a plurality of phases.

15. A system for visually guided storage array installation, comprising:
a receiving component for receiving an installation plan for a storage array;
a determining component for determining a component of the storage array specified in the installation plan; and
a displaying component for displaying one or more visual indicators associated with the component of the storage array to indicate a status corresponding to executing a portion of the installation plan, wherein displaying one or more visual indicators comprises: activation of a first indicator associated with a component of the storage array; and
de-activation of a second indicator associated with the component of the storage array in response to executing the portion of the installation plan.

16. The system of claim 15, wherein the receiving component is further for receiving a modified installation plan in response to detecting an update to the storage array.

17. The system of claim 16, wherein detecting an update to the storage array comprises determining hardware that requires a differing installation plan.

18. The system of claim 15, wherein the determining component and the displaying component are further for repeating the determining the component and the displaying the one or more visual indicators until all portions of the installation plan specifying the component of the storage array have been completed.

19. The system of claim 18, further comprising:
a status monitoring component for monitoring a status of the installation plan and causing one or more indicators to provide an indication of an action to take based on the status.

20. The system of claim 15 wherein the one or more visual indicators indicate status of an installation process at each phase of the installation process, for a plurality of phases.

* * * * *